United States Patent [19]

Muto et al.

[11] Patent Number: 4,811,137
[45] Date of Patent: Mar. 7, 1989

[54] DISK CARTRIDGE SHUTTER OPENING AND CLOSING MECHANISM

[75] Inventors: Yoshio Muto; Mitsuo Takahashi; Koji Asako, all of Tokyo, Japan

[73] Assignee: Copal Co., Ltd., Tokyo, Japan

[21] Appl. No.: 50,531

[22] Filed: May 15, 1987

[30] Foreign Application Priority Data

May 21, 1986 [JP] Japan ................................ 61-114793

[51] Int. Cl.⁴ ...................... G11B 5/012; G11B 33/02
[52] U.S. Cl. ................................. 360/77.2; 360/99.06
[58] Field of Search ..................... 360/97.99; 369/77.2

[56] References Cited

U.S. PATENT DOCUMENTS 4,745,500  5/1988  Davis ..................................... 360/97

FOREIGN PATENT DOCUMENTS 58-102370  6/1983  Japan ..................................... 360/97

Primary Examiner—A. Heinz

[57] ABSTRACT

A disk cartridge shutter opening and closing mechanism which is disclosed herein is designed to open and close a shutter of a disk cartridge having a variety of disks contained in a shuttered hard case and is of a construction having a pair of arms swingably mounted within a range of a width of the disk cartridge, the arm having a block which is pivotally mounted on its leading end and integrally formed with an engage head portion and an arm portion which are used for opening and closing of the shutter. The pushing-in of the disk cartridge causes the pair of arms to be swung toward each other, thereby opening and closing the shutter. A smaller pushing-in force enables the shutter to be smoothly opened and closed. Moreover, the whole mechanism is thin and compact.

21 Claims, 4 Drawing Sheets

DISK CARTRIDGE SHUTTER OPENING AND CLOSING MECHANISM

BACKGROUND OF THE INVENTION

1. Field of the Invention

The present invention relates to a disk cartridge shutter opening and closing mechanism for opening and closing a shutter of a disk cartridge having a variety of disks contained in a shuttered hard case.

2. Description of the Prior Art

In general, there are conventionally known disks such as optical and magnetic disks serving as media for recording and reproducing information. Such a type of disks should be carefully handled in such a manner that their surfaces are not flawed, in order to ensure that the recorded information can be protected and also properly recorded and reproduced at all times.

Thereupon, there has been developed a disk cartridge which has a disk contained in a hard case and is designed so that a shutter can be opened when the disk is to be recorded or reproduced. This disk cartridge provides a dust-proof property and an improvement in portability for the disk, and also provides for easy handling of the disk.

FIGS. 5 and 6 show a disk cartridge 1 and a pair of arms 2A and 2B constituting a prior art disk cartridge shutter opening and closing mechanism.

The disk cartridge 1 is constituted of a thin boxlike synthetic resin hard case 3 having a disk (not shown) normally contained therein and a shutter 5 for opening and closing shutter openings 4A and 4B respectively perforated in opposite surfaces, i.e., surfaces A and B of the hard case 3. It should be noted that for convenience of understanding, the disk cartridge 1 is shown as being turned upside down from the actually used state in Figures.

More specifically, the hard case 3 is formed such that the surfaces A and B may be substantially rectangular, and the shutter openings 4A and 4B are defined substantially at the central locations of the surfaces A and B. The shutter openings 4A and 4B are provided to permit insertion of a recording and reproducing head of a disk mechanism and a disk driving mechanism (both not shown) to attain an access of them to the disk in recording or reproducing on the disk contained in the hard case 3. The shutter 5 is formed from a thin metal plate by folding into a substantially ]-shape in section, such that shutter opening blocking portions 5A and 5B covering the corresponding shutter openings 4A and 4B from the outside are connected with a fore end face 5C covering a fore end face 3C of the hard case 3 from the outside. The fore end faces 3C and 5C represent leading end faces in a direction (indicated by an arrow a in FIG. 5) of insertion of the hard case 3 into the disk mechanism. The shutter 5 is mounted to extend from a side of the fore end face 3C of the hard case 3 and over the surfaces A and B and is adapted to slide in a direction (indicated by an arrow b in FIG. 5) of width of the hard case 3 to open and close the individual shutter openings 4A and 4B by the corresponding shutter opening blocking portions 5A and 5B. The shutter 5 is also attached so that it is prevented from being released from the hard case 3 by arresting rear ends of the shutter opening blocking portions 5A and 5B from the above by means of arresting plates 6 secured on the surfaces A and B of the hard case 3 and by holding an engage piece (not shown) formed on the shutter 5 in engagement in a groove (not shown) widthwise engraved in the hard case 3. It is to be noted that for convenience, the shutter 5 is shown in FIG. 1 as being displaced to partially open the individual shutter openings 4A and 4B, but except for during recording and reproducing, the shutter 5 is biased by a return spring (not shown) to normally close the individual shutter openings 4A and 4B. In addition, during closing with the shutter 5, an engage piece (not shown) formed on the fore end face 5C of the shutter 5 is placed in engagement with a locking member (not shown) contained in the fore end 3C of the hard case 3 to lock the shutter 5.

The pair of arms 2A and 2B are provided as a mechanism for automatically opening and closing the shutter 5 when inserting and withdrawing the thus-formed disk cartridge 1 into and from the disk mechanism. One of the arms 2A serves to open and close the shutter 5, when the hard case 3 is inserted and withdrawn with the surface A above, and the other arm 2B serves to open and close the shutter 5, when the hard case 3 is inserted and withdrawn with the surface B above. Both of the arms 2A and 2B are pivotally mounted at their base ends on a housing 7 by pivots 8A and 8B, respectively, and are placed to stand by in an initial position in which shutter opening and closing pins 9A and 9B on the corresponding leading ends of the arms are automatically inserted into and engage hole 10 as an opening and closing engage means provided across a corner between the fore end face 5C and the shutter opening blocking portion 5A of the shut-off shutter 5 of the disk cartridge 1 which is being inserted.

The opening and closing of the shutter 5 of the disk cartridge 1 by the arms 2A and 2B are conducted in the following manner:

First, the disk cartridge 1 is inserted into the disk mechanism with the fore end face 3C of the hard case 3 being forward and with the surface A being down. This causes the disk cartridge 1 to be inserted into the housing 7 with the fore end face 5C of the shutter 5 being forward, until the shutter opening and closing pin 9A of the one arm 2A is inserted into the engage hole 10 defined in the shutter 5. The locking member contained in the hard case 3 is pushed inwardly into the hard case 3 to release the engagement of the engage piece of the shutter 5 with the locking member. In this case, the other arm 2B has its shutter opening and closing pin 9B abutting against the fore end face 3C of the hard case 3. Thereafter, further pushing the disk cartridge 1 into the disk mechanism causes the individual arms 2A and 2B to be pivotally moved about the corresponding pivots 8A and 8B in directions indicated by arrows c and d in FIG. 5 in such a manner that the shutter opening and closing pin 9A and 9B is pushed by the disk cartridge 1. In this case, the arms 2A and 2B are moved along the width of the hard case 3 with the shutter opening and closing pin 9A remaining engaged in the engage hole 10 in the shutter 5 and hence, the shutter moves in a direction to open the shutter openings 4A and 4B relative to the hard case 3. When the disk cartridge 1 has been pushed in to a given position, the hard case 3 is brought into abutment against a stopper (not shown) and thus stopped, while at the same time permitting the shutter 5 to fully open the shutter openings 4A and 4B. At this time, both the arms 2A and 2B are in states to intersect each other. During this opening movement of the shutter 5, the other arm 2B which is not used for opening the shutter 5 slides in such a manner that the shutter opening and closing pin 9B at its fore end rides onto the fore end face 5C of the shutter 5 from the fore end face 3C of the hard case 3.

When the shutter 5 is to be closed, the individual arms 2A and 2B, upon releasing of the safety lock (not shown), starts to pivotally move in a direction opposite to that during opening of the shutter 5 under an action of a returning resilient force biased in directions indicated by arrows e and f in FIG. 5. The pivotal movement of the arms 2A and 2B causes the disk cartridge 1 to be moved in a direction to be forced out of the housing 7, and at the same time, the shutter opening and closing pin 9A of the arm 2A is moved reversely to the opening movement, thereby causing the shutter 5 to close the individual shutter openings 4A and 4B under an action of its own returning resilient force in a closing direction. When the hard case 3 leaves the shutter opening and closing pins 9A and 9B of the arms 2A and 2B, the engage piece of the shutter 5 engages the locking member within the hard case 3 to complete the shutting-off of the individual shutter openings 4A and 4B with the shutter 5.

In each the arms 2A and 2B constituting the prior art disk cartridge shutter opening and closing mechanism, however, the following problems are encountered: Because each shutter opening and closing pin 9A, 9B used for opening and closing of the shutter 5 is mounted to rise from the arm 2A, 2B in a direction of thickness of the hard case 3, the bodies of each arms 2A and 2B must be provided at places vertically out of the thickness of the hard case 3, respectively. Therefore, a space more than the thickness of the hard case 3 is required for attaching the arms 2A and 2B, and the thickness of the housing 7 is also increased more than required, resulting in an increased size of the whole construction. In addition, when the shutter 5 is intended to be opened using the one arm 2A, the shutter opening and closing pin 9B at the fore end of the other arm 2B is permitted to initially slide, and it is then forced to invariably ride onto the fore end face 5C of the shutter 5 and subsequently slide thereon. However, a large force is required for such riding of the shutter opening and closing pin 9B onto the fore end face 5C. This causes the pushing-in force on the disk cartridge 1 to have to be increased.

OBJECT OF THE INVENTION

It is therefore an object of the invention to provide a disk cartridge shutter opening and closing mechanism which can be formed so that the whole construction is thin and compact and which enables a shutter to be smoothly opened and closed only by use of a decreased pushing-in force.

SUMMARY OF THE INVENTION

To accomplish the above object, according to the present invention, there is a provided a disk cartridge shutter opening and closing mechanism for opening and closing a shutter through sliding movement of the shutter in a direction of width of a disk cartridge, comprising: a pair of arms mounted with their leading ends opposed to fore end faces of the disk cartridge and the shutter within a thickness of the disk cartridge for swinging movement in the direction of width of the disk cartridge in such a manner that the pushing-in movement of the disk cartridge causes the arms to be pushed toward each other; and a shutter opening and closing lever pivotally mounted on each of the arms for oscillating movement in the direction of width of the disk cartridge and having an engage head portion adapted to engage an opening and closing engagement formed on the fore end face of the shutter and arm portions extending from the engage head portion in the opposite directions of width of the disk cartridge.

With such technical feature of the present invention, the whole construction can be thin and compact, and the shutter can be smoothly opened and closed only by a smaller pushing-in force, leading to a decrease in thickness of and a compactification of a disk mechanism and also to a decrease in cost.

The above and other objects, features and advantages of the invention will become apparent from reading of the following description of the preferred embodiment taken in conjunction with the accompanying drawings.

DESCRIPTION OF THE PREFERRED EMBODIMENTS

Figure 1:
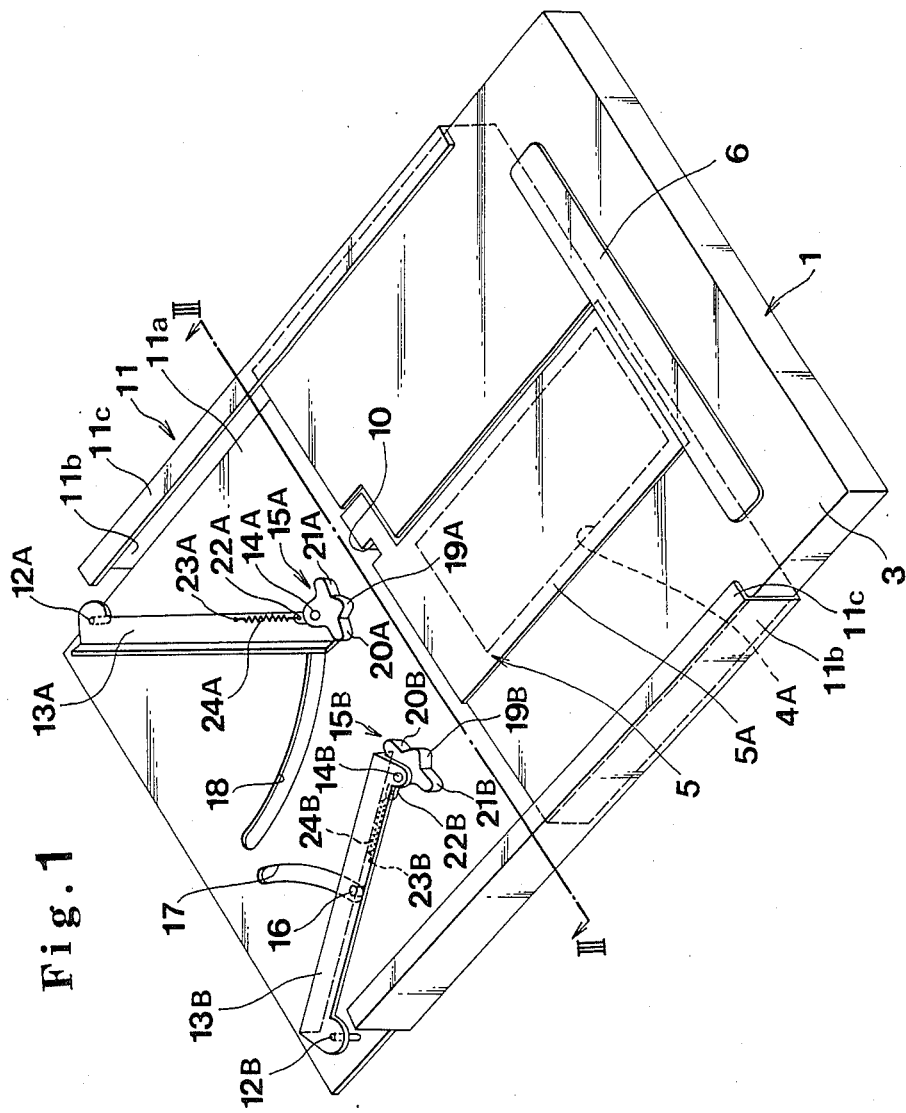
FIG. 1 is a perspective view of a disk cartridge shutter opening and closing mechanism according to a preferred embodiment of the present invention.
Figure 2:
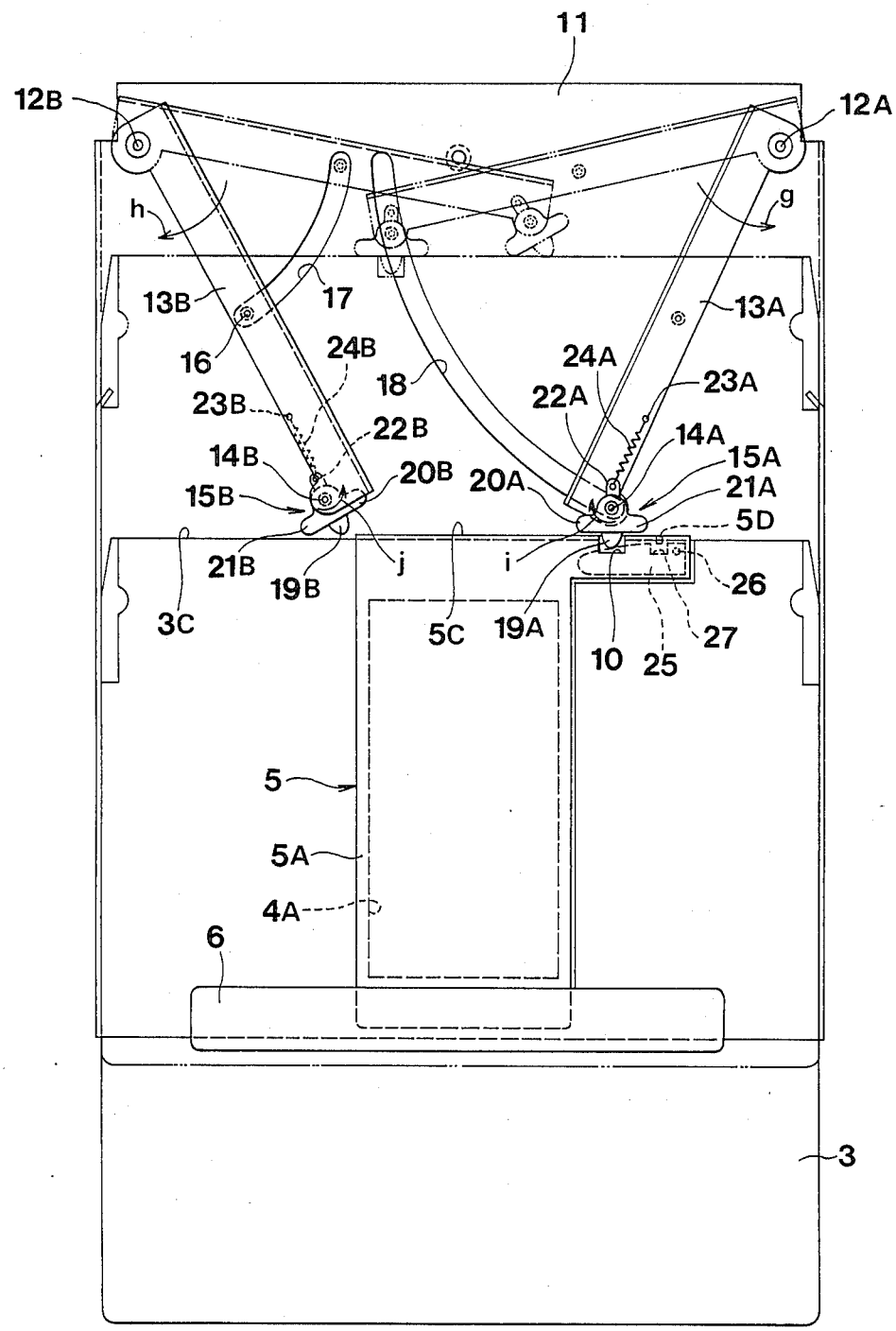
FIG. 2 is a plan view of the shutter opening and closing mechanism shown in FIG. 1.
Figure 3:
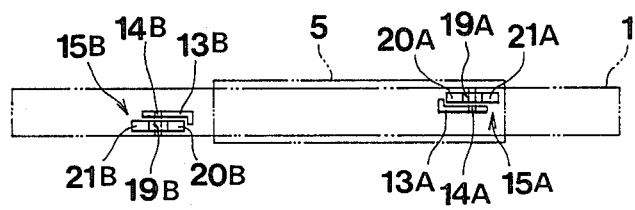
FIG. 3 is a section view taken along a line III—III in FIG. 1.

Referring to FIGS. 1 to 3, there is shown one embodiment of the present invention.

A shutter opening and closing mechanism according to this embodiment is also designed to open and close a shutter 5 relative to a disk cartridge 1 equivalent to that shown in FIG. 1. Therefore, the description of the disk cartridge 1 will be omitted herein. In FIGS. 1 and 2, there reference numeral 11 is a housing in which the disk cartridge 1 is inserted and which is illustrated upside down for convenience of understanding.

The housing 11 is constituted of an upper planar plate 11a, side plates 11b folded from the opposite sides of the upper plate 11a, and bearing plates 11c inwardly folded from the lower ends of the individual side plates 11b for bearing the disk cartridge 1 thereon.

The shutter opening and closing mechanism for the disk cartridge according to the present embodiment is constituted of a pair of arms 13A and 13B pivotally mounted at their base ends on fore end portions of the housing 11 in a direction of insertion of the disk cartridge 1 by pivots 12A and 12B, respectively, and shutter opening and closing levers 15A and 15B pivotally mounted to leading ends of the arms 13A and 13B by pivots 14A and 14B parallel to the pivots 12A and 12B.

In further description, the arms 13A and 13B and the shutter opening and closing levers 15A and 15B are each formed into a thin type which may be permitted to stay within a thickness of a hard case 3 of the disk cartridge 1, as shown in FIG. 1. The reason why they can be formed in a thin type in this way is that they are constructed to open and close the shutter 5 by utilizing only a fore end 3C of the hard case 3 and a fore end face 5C of the shutter 5 as described hereinafter. Each of the arms 13A and 13B is formed into an L-shape in section to have an increased rigidity and is swingable about the corresponding pivot 12A, 12B in a direction of width of the cartridge 1. One of the arms 13B is more smoothly swingable by placing a guide pin 16 in engagement in a small arcuate guide groove 17 made in the upper plate 11a of the housing 11. The other arm 13A is likewise smoothly swingable by bringing an extension of the pivot 14A into engagement in a large arcuate guide groove made in the upper plate 11a of the housing 11. In addition, the individual arms 13A and 13B are resiliently biased back in directions indicated by arrows g and h in FIG. 2, i.e., in directions to push out the disk cartridge 1, respectively. The individual shutter opening and closing levers 15A and 15B pivotally mounted at the fore ends are each shown as being stopped by a suitable stopper (not shown) in an initial position (indicated by a solid line in FIGS. 1 and 2) in which a disk cartridge 1 being inserted is engaged in an engage hole 10 in the shutter 5. Each of the shutter opening and closing levers 15A and 15B is oscillatable about the corresponding pivot 14A, 14B along the width of the disk cartridge 1 and is formed, into a substantially T-shaped configuration, of an engage head portion 19A, 19B sized to engage a hold portion of the engage hole 10 in a section of the fore end face 15C and faced to the fore end portion 3C of the hard case 3 and the fore end face 5C of the shutter 5, and arm portions 20A and 20B; 21A and 21B extending from each the engaged head portions 19A and 19B in each of the opposite directions of width of the disk cartridge 1 to prevent each shutter opening and closing level 15A, 15B from pivotally moving more than an amount required during opening or closing of the shutter 5. In each of the shutter opening and closing levers 15A and 15B, there is a tension spring 24A, 24B extending in tension between each of rear projections 22A and 22B provided on the sides opposite to the respective engage head portions 19A and 19B with respect to the respective pivots 14A and 14B and each of spring locking portions 23A and 23B of the individual arms 13A and 13B, so that the adjacent arm portions 20A and 20B of the shutter opening and closing levers 15A and 15B are biased to rotate away from the fore end face 5C of the shutter 5 (i.e., in directions indicated by arrows i and j in FIG. 2).

The pair of arms 13A and 13B are provided so that they may be each contained in one of spaces provided in regions bisected along the thickness of the disk cartridge 1, as shown in FIG. 3. This is for the purpose of providing the opening and closing of the shutter 5 relative to a surface A of the hard case 3 by use of the one arm 13A and the like and providing the opening and closing of the shutter 5 relative to a surface B of the hard case 3 by use of the other arm 13B and the like, because the engage hole 10 in the shutter 5 is defined from a shutter-opening blocking portion 5A to have a size ranging up to one half of the thickness of the disk cartridge 1.

Description will now be made of the operation of this embodiment.

When a disk cartridge 1 is still not inserted, each of the individual arms 13A and 13B is in a stopped state in an initial position shown by a solid line in FIGS. 1 and 2.

As the disk cartridge 1 is inserted more and more deeply into the housing 1 to open the shutter 5 relative to the surface A of the hard case 3 as shown in FIGS. 1 and 2, the engage head portion 19A of the shutter opening and closing lever 15A pivotally mounted at the fore end of the arm 13A is first engaged in that hole portion of the engage hole 10 in the shutter 5 which is in the section of the fore end face 5C. This causes a locking member 25 within the hard case 3 to be inwardly pushed into the hard case 3 around the pin 26, so that the engagement of the engage portion of the locking member 25 with a stopper 5D of the shutter 5 is released, making it possible for the shutter 5 to move in an opening direction. Up to this time, the other arm 13B has been held in such a manner that the engage head portion 19B of the shutter opening and closing lever 15B pivotally mounted at the leading of the arm 13B abuts against the fore end 3C of the hard case 3 and the arm portion 20B of the shutter opening and closing lever 15B is spaced apart from the fore end 3C of the hard case 3 under an action of a tensile resilient force of the tension spring 24B.

Thereafter, when the disk cartridge 1 is further pushed into the housing 11, the individual arms 13A and 13B pivotally move in opposite directions indicated by arrows g and h, i.e., toward each other. In this case, the shutter 5 is gradually opened because the engage hole 10 in the shutter 5 is permitted to engage the engage head portion 19A of the shutter opening and closing lever 15A by the one arm 13A. At this time, the shutter opening and closing lever 15A pivotally mounted on the fore end of the arm 13A opens the shutter 5 while being held in an proper position with the engage head portion 19A being inserted into the engage hole 10 and with the opposite arm portions 20A and 21A being pivotally moved about the pivot 14A to lie in parallel to the fore end face 5C of the shutter 5. Again at this time, in the other arm 13B, a frictional force, by virtue of which the shutter opening closing lever 15B is intended to pivotally move in a direction opposite to the direction indicated by the arrow j in FIG. 2, is produced between the engage head portion 19B and the fore end face 3C of the hard case 3 which abut against each other when the motion of opening the shutter 5 proceeds. When an end edge of the shutter 5 closer to the shutter opening and closing lever 15B is moved toward the engage head portion 19B, the arm portion 20B is still held apart from the fore end face 5C of the hard case 3, because the shutter opening and closing lever 15B is biased by means of the tension spring 24B to rotate in the direction indicated by the arrow j in FIG. 2. Therefore, the end edge of the shutter 5 is then passed below the arm portion 20B spaced apart from the fore end face of the hard case 3 without reception of a resisting force and ultimately abuts against the engage head portion 19B. Thereafter, when the shutter 5 is further opened, the shutter opening closing lever 15B is pivotally moved about the pivot 14B in a direction opposite to the direction indicated by the arrow j, so that the engage head portion easily rides on the shutter 5. Thus, a small pushing-in force causes the shutter opening and closing lever 15B to smoothly ride onto the shutter 5.

Thereafter, further pushing of the disk cartridge 1 into the housing 11 causes the individual arms 13A and 13B to pivotally move, thereby allowing the opening of the shutter 5 to proceed. When the shutter 5 attains a fully-opened state, the hard case 3 is stopped abutting against a stopper (not shown) mounted on the housing. Then, a safety lock (not shown) for preventing accidental removal of the disk cartridge 1 is engaged.

Subsequently, with the shutter 5 remaining fully-opened, the disk cartridge 1 is lowered together with the housing 11, so that a recording and reproducing head standing-by therebelow is brought into access to a disk within the hard case 3 through the shutter opening 4A, while connecting the disk to a driving mechanism through the shutter opening 4A.

When the disk cartridge 1, after completion of recording or reproducing on the disk, is raised together with the housing 11 to a position capable of removing the disk cartridge 1, the safetly lock is released, and the disk cartridge 1 is automatically pushed out under an action of a resilient returning force of each the arms 13A and 13B in the same manner as in the prior art, while at the same time causing the shutter 5 to be closed both by the movement of the one arm 13A in a closing direction and by a resilient closing force on the shutter 5.

Figure 4:
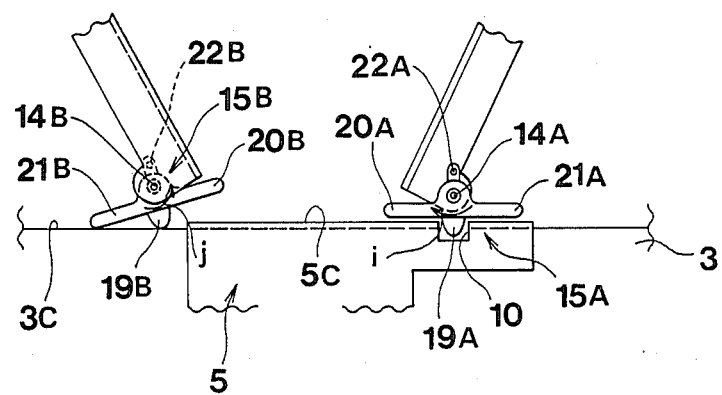
FIG. 4 is a plan view of details of a disk cartridge shutter opening and closing mechanism according to another preferred embodiment of the present invention.
Figure 5:
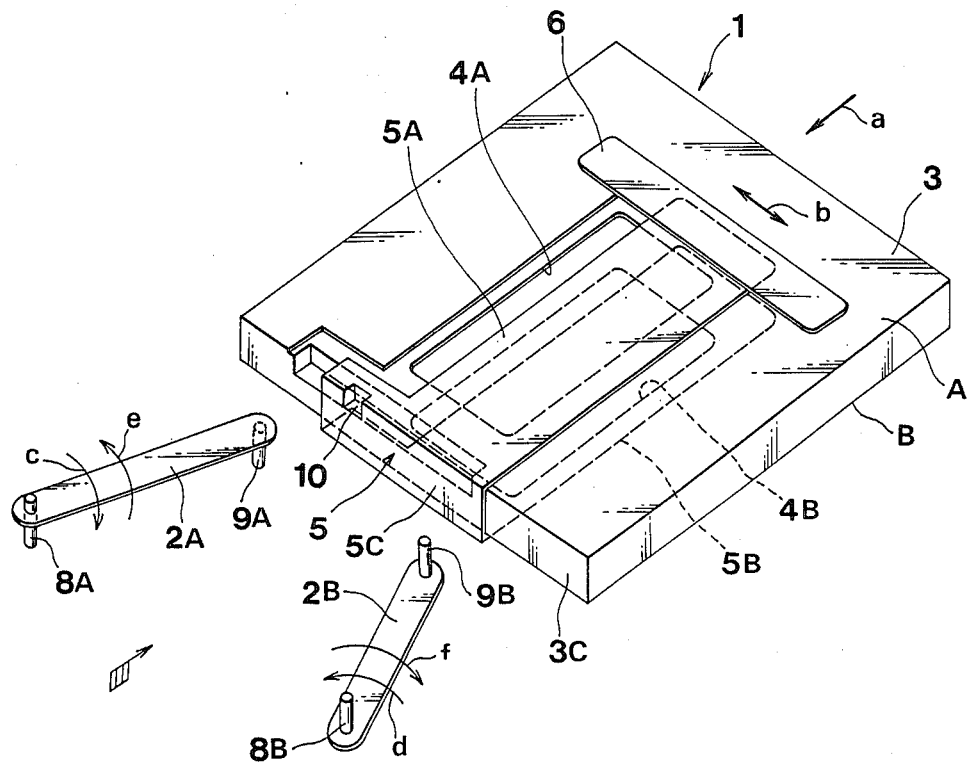
FIG. 5 is a perspective view of a prior art disk cartridge shutter opening and closing mechanism.
Figure 6:
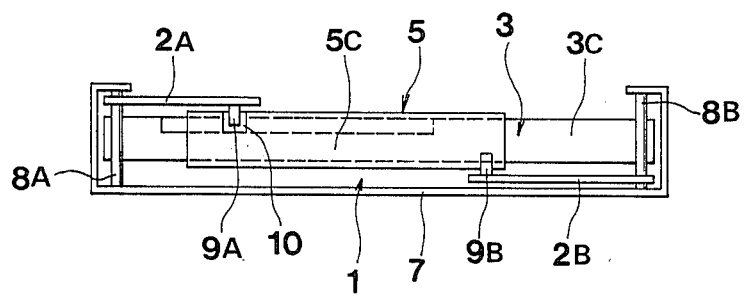
FIG. 6 is a sectional view taken in a direction indicated by a feathered arrow in FIG. 5.

FIG. 4 illustrates another embodiment of the present invention.

In this second embodiment, the tension springs 24A and 24B used in the above first embodiment are omitted and as substitutes for them, arm portions 20A, 20B, 21A and 21B extending from the engage head portions 19A and 19B of the shutter opening and closing levers 15A and 15B in a widthwise direction of the disk cartridge 1 are formed to each have an increased length, for example, such that the arm portion 20B, which abuts against the fore end face 3C placed off the shutter 5 when the cartridge 1 has reached the individual arms 13A and 13B standing-by in their initial positions, extends over the fore end face 5C of the shutter 5.

For example, when the shutter 5 is opened upon movement toward the shutter opening and closing lever 15B, if the tension spring 24B is not provided and the arm portion 20B is shorter, the shutter opening and closing lever 15B is pivotally moved about the pivot 14B in a direction opposite to the direction indicated by the arrow j in FIG. 2 by a frictional force between the engage head portion 19B and the fore end face 3C of the hard case 3 in concurrence with starting of the opening motion, until the arm portion 20B abuts against the fore end 3C of the hard case 3. Therefore, when the end edge of the shutter 5 reaches the shutter opening and closing lever 15B, the arm portion 20B has already abutted against the fore end 3C and hence, the arm portion 20B subsequently must ride on the end edge of the shutter 5. This results in an increased force required for such riding-on.

Thereupon, with the present embodiment, the longer arm portion 20B abuts onto the fore end face 5C of the shutter 5 when the shutter opening and closing lever 15B has been pivotally moved about the pivot 14B in the direction opposite to the direction indicated by the arrow j in FIG. 4 (although this pivotal movement of the shutter opening and closing lever 15B may occur either before and after abutting of the end edge of the shutter 5 against the engage head portion 19B, the both cases are included). Thus, the riding onto the end edge of the shutter 5 is provided by the engage head portion 19B, leading to a decrease in force required for such riding-on.

It should be understood that in the embodiment shown in FIG. 4, the tension springs 24A and 24B may be provided as in the above first embodiment.

What is claimed is:

1. A disk cartridge shutter opening and closing mechanism for opening and closing a shutter through sliding movement of the shutter in a direction of width of a disk cartridge, comprising:

a pair of arms mounted with their leading tip ends opposed to fore end faces of the disk cartridge and the shutter within a thickness of said disk cartridge for swinging movement in the direction of width of said disk cartridge in such a manner that the pushing movement of said disk cartridge causes said arms to be pushed toward each other; and a shutter opening and closing lever pivotally mounted on each tip of said arms for oscillating movement in the direction of width of said disk cartridge and having an engage head portion adapted to engage an opening and closing engagement formed on the fore end face of said shutter and arm portions extending from said engage head portion to the both side ends of said disk cartridge.

2. A disk cartridge shutter opening and closing mechanism according to claim 1, wherein that arm portion of said shutter opening and closing lever which is closer to said shutter is biased to rotate away from the fore end face of said shutter when said engage head portion abuts against the fore end of said disk cartridge exposed with the shutter in a fully closed state.

3. A disk cartridge shutter opening and closing mechanism according to claim 1, wherein said shutter opening and closing lever is formed to have a size such that the arm closer to the shutter extends over the fore end face of said shutter when said engage head portion abuts against the fore end of said disk cartridge exposed with the shutter in a fully closed state upon pushing-in of the disk cartridge.

4. In a disk reader receiving a cartridge with a transversely moveable shutter exposing oppositely facing cartridge apertures in a first position and covering said apertures in a second position, said cartridge being longitudinally insertable, via a reader receptacle, into and operable in said reader in a first cartridge position and also being insertable, via said reader receptacle, into and operable in said reader in a second cartridge position rotated one hundred eighty degrees about a longitudinal axis from said first cartridge position, apparatus for moving said shutter to said first position responsively to said cartridge being inserted into said reader in either said first or said second cartridge position, comprising:

a. arms mounted within said reader for arcuate movement in space defined by a longitudinal projection of said receptacle between first arm positions at which means, at extremities of said arms, for moving said shutter contact said cartridge upon cartridge insertion into said receptacle, said arms moving to second arm positions responsively to cartridge insertion into said receptacle thereby moving said shutter moving means through arcs within said space;

b. said means for moving said shutter pivoting on said arms about axes parallel with axes about which said arms move arcuately, translating arcuate arm movement into transverse motion applied to said shutter, comprising:

(1) protruding portion means extending generally towards said receptacle for moving said shutter transversely by contact with said shutter as said cartridge is inserted into said reader; and (2) means, extending transversely on either side of said protruding portion means, adapted to facingly contact said cartridge, for limiting rotation of said protruding portion means about said arms during shutter opening by interfering contact with said cartridge.

5. In a disk reader having a receptacle receiving a cartridge with an openable shutter for allowing access to said cartridge interior via a selected one of two oppositely facing cartridge apertures when in a first shutter position and for covering said apertures therey blocking access to said cartridge interior when in a second shutter position, said shutter having a central face portion slidably movable between said first and second positions along a transverse cartridge surface substantially normal to longitudinal direction of cartridge travel entering said receptacle, said central face having a pocket therein, said shutter having respective covering portions extending longitudinally from said central face portion along respective opposite outwardly facing surfaces of said cartridge in which said apertures are formed, said cartridge being longitudinally insertable into said receptacle in a first position and also being longitudinally insertable into said receptacle when said cartridge has been rotated one hundred eighty degrees about a longitudinal axis from said first position, said cartridge being operable in said disk reader in either said first position or in said position longitudinally rotated one hundred eighty degrees therefrom, apparatus for moving said shutter from said second to said first position as said cartridge is inserted into said reader, said apparatus comprising:
   a. a pair of arms vertically displaced one from another and pivotally mounted within said reader at opposite lateral positions remote said receptacle for arcuate pivotal movement, one above the other within space defined by longitudinal projection of an opening to said receptacle through which said cartridge is inserted into said reader, about respective parallel axes which are perpendicular to said longitudinal and transverse directions, said arms moving through arcs one above another in a plane defined by said cartridge and said receptacle, said arms being moveable from first positions at which means, mounted at said arm extremities remote from said arm pivot points, for engaging and moving said shutter transversely in response to longitudinal insertion of said cartridge into said reader contact said cartridge upon insertion into said receptacle, said arms being movable through said arcs to second positions at which said shutter has moved transversely to open said apertures;
   b. means within said reader for guiding said pivotable arms through an arcuate path of predetermined length between said first and second positions;
   c. said means, at said arm extremities remote from said pivot points, for engaging said shutter and moving said shutter transversely in response to arcuate movement of said arms upon longitudinal movement of said cartridge into said reader, comprising:
      i. T-shaped members mounted, at positions proximate juncture of leg and bar portions of said T, on said arm extremities remote from said arm pivot points, for pivotal movement about axes parallel with said arm axes, for translating arcuate movement of said arms into transverse motion applied to said shutter, each T-shaped member comprising:
         (1) a leg portion extending generally towards said receptacle opening, adapted for insertion into and withdrawal from a pocket formed in said shutter, for moving said shutter transversely by interfering contact with a wall of said shutter pocket as said cartridge is longitudinally inserted into said reader;
         (2) a pair of bar portions, extending transversely on either side of said leg portions a distance from said T-shaped member pivotal mounting greater than leg portion length extending from said T-shaped member pivotal mounting, having generally planar parallel surfaces perpendicular to an axis of said leg portion passing through the T-shaped member pivotal mounting, said planar surfaces facing the same way as said leg portion respecting the T-shaped member pivotal mounting on said arms, said planar surfaces being adapted for facing abutting contact with surfaces of said cartridge and said shutter which face said receptacle as said cartridge is inserted into said reader, for limiting rotation of said T-shaped members about their pivotal mountings on said arms during shutter opening and closing, as said cartridge is inserted into or withdrawn from said reader, by interfering contact of respective ones of said bar portions associated with respective ones of said arms with said shutter proximate said shutter pocket and with said cartridge.

6. In a disk reader having a generally rectangularly configured cartridge receptacle, a pair of channels extending longitudinally inwardly of said reader from said receptacle, sized to slideably receive respective transverse edges of said cartridge and a longitudinally and transversely extending plate for contacting a surface in which a cartridge access aperture is formed, said reader receiving a generally rectangular cartridge with a shutter allowing access to said cartridge interior via two oppositely facing cartridge apertures in a first shutter position and covering said apertures in a second shutter position, said shutter having a central facing portion movable between said first and second positions along a cartridge surface which is inserted into said receptacle and is transverse to longitudinal direction of cartridge travel into said receptacle, said shutter having respective aperture covering portions extending longitudinally from said central portion along respective oppositely outwardly facing surfaces of said cartridge in which said apertures are formed, said cartridge being longitudinally insertable into said receptacle in a first position and also when rotated one hundred eighty degrees about a longitudinal axis so that said apertures occupy respective positions reversed from positions occupied in said first receptacle position, said shutter including pocket means on said central portion adapted for engaging means within said reader for opening said apertures by transversely moving said shutter along said cartridge in response to movement of said aperture opening means when said shutter is inserted into said receptacle, apparatus for moving said shutter from said second to said first position as said cartridge is inserted into said reader, said apparatus comprising:
   a. a pair of arms vertically displaced one from another and pivotally mounted within said reader at positions longitudinally remote from said receptacle, for arcuate pivotal movement one above the other about respective parallel axes which are perpendicular to said longitudinal and transverse directions, said arms moving through arcs one above another in a plane defined by said cartridge and said receptacle, said arms being moveable from first positions at which means mounted at said arm extremities remote from said arm pivot points for engaging and moving said shutter transversely in response to longitudinal insertion of said cartridge into said reader contact said cartridge upon insertion into said receptacle, said arms being movable through said arcs to second positions at which said shutter has moved transversely to open said apertures;

b. means within said reader for guiding said pivotable arms through an arcuate path of predetermined length between said first and second positions; and c. said means, at said arm extremities remote from said pivot points, for engaging said shutter and moving said shutter transversely in response to arcuate movement of said arms which is in response to longitudinal movement of said cartridge into said reader, comprising:

i. T-shaped members pivotally mounted, at positions proximate juncture of leg and bar portions of said T, on said arm extremities remote from said arm pivot points, for pivotal movement about axes parallel with said arm axes, for translating arcuate movement of said arms into transverse motion applied to said shutter, each T-shaped member comprising:

(1) a leg portion extending generally towards said receptacle opening, adapted for insertion into and withdrawal from a pocket formed in said shutter, for moving said shutter transversely by interfering contact with said shutter pocket as said cartridge is longitudinally inserted into or withdrawn from said reader; and (2) bar portions, extending transversely on either side of said leg portions a distance from said T-shaped member pivotal mounting at least equal to leg portion length extending from said T-shaped member pivotal mounting, having generally planar parallel surfaces perpendicular to an axis of said leg portion passing through the T-shaped member pivotal mounting, said planar surfaces facing the same way as said leg portion respecting the T-shaped member pivotal mounting on said arms, said planar surfaces being adapted for facing contact with surfaces of said cartridge and said shutter which face said receptacle as said cartridge is inserted into said reader, for limiting rotation of said T-shaped members about their pivotal mountings on said arms during shutter opening and closing as said cartridge is inserted into or withdrawn from said reader by interfering contact of respective ones of said bar portions associated with respective ones of said arms with said shutter proximate said shutter pocket and with said cartridge surface; and ii. spring means for biasing said T-shaped members about said pivotal mountings towards positions at which said leg portion axes, if extended through said pivotal mountings of said T-shaped members to said arms, would intersect said pivotal mountings of said arms to said reader.

7. Apparatus of claim 4 further comprising means within said reader for guiding said arm means pivotally through an arcuate path of predetermined length between said first and second positions.

8. Apparatus of claim 7 wherein respective ones of said arm means move through arcuate paths of equal angular displacement between said first and second positions.

9. Apparatus of claim 8 wherein said arm means are vertically displaced one from another.

10. Apparatus of claim 9 wherein said means for translating arcuate movement of said arms into transverse motion applied to said shutter are pivotable independently of arcuate movement of said arm means.

11. Apparatus of claim 10 further comprising means for biasing said means for translating arcuate movement of said arms into transverse motion applied to said shutter towards positions at which said protruding portions are aligned with lengthwise directions of said arm means.

12. Apparatus of claim 11 wherein said transversely extending means adapted for facing contact with said cartridge extend transversely on either side of said protruding portion from a position of pivotal mounting of said means for translating arcuate movement of said arms into transverse motion applied to said shutter a distance greater than length of said protruding portion means extends from said position of pivotal mounting of said means for translating arcuate movement of said arms in a transverse motion applied to said shutter to tip of said protruding portion means.

13. Apparatus of claim 12 wherein said means for guiding said arm means for arcuate movement further comprises a plate member within said reader having a pair of arcs formed therein and means extending vertically from said arm means for sliding receipt by said arcs formed in said plate means.

14. Apparatus of claim 13 wherein said arm means move from said first arm positions to said second arm positions through arcs which are vertically overlapping.

15. Apparatus of claim 14 wherein said arcs formed in said plate subtend the same angle but are of different arcuate length.

16. Apparatus of claim 4 further comprising means for biasing said means for translating arcuate movement of said arms into transverse motion applied to said shutter towards positions at which said protruding portions are aligned with lengthwise directions of said arm means.

17. Apparatus of claim 16 wherein said arm means move from said first arm positions to said second arm positions through arcs which are vertically overlapping.

18. Apparatus claim 4 wherein said arm means move from said first arm positions to said second arm positions through arcs which are vertically overlapping.

19. Apparatus of claim 4 wherein said transversely extending means adapted for facing contact with said cartridge extend transversely on either side of said protruding portion from a position of pivotal mounting of said means for translating arcuate movement of said arms into transverse motion applied to said shutter a distance greater than length of said protruding portion means extends from said position of pivotal mounting of said means for translating arcuate movement of said arms in a transverse motion applied to said shutter to tip of said protruding portion means.

20. Apparatus of claim 4 further comprising means within said reader for biasing said arm means towards said first arm positions.

21. In a disk reader receiving a cartridge with a shutter transversely moveable between open and closed positions, said cartridge being insertable into and operable in said reader in either of two cartridge orientations rotated 180° from one another, apparatus for moving said shutter to said open position upon cartridge insertion into said reader, comprising:

a. means, mounted within said reader for arcuate movement in space defined by a projection of said cartridge, for arcuately transporting shutter moving means within said space responsively to contact of said shutter moving means with said cartridge upon cartridge insertion into said reader;

b. said shutter moving means pivoting on said transporting means remote from an axis about which said transporting means arcuately moves;

c. said shutter moving means pivoting within said space to translate arcuate movement of said transporting means into transverse motion applied to said shutter and comprising:

i. means extending in said space towards said cartridge for sliding said shutter open by mating contact with said shutter as said cartridge is inserted into said reader; and ii. means, extending generally transversely from said shutter sliding means, for limiting rotation of said shutter sliding means about said transporting means during shutter opening by interfering contact with said cartridge.

* * * * *